United States Patent Office 3,433,072
Patented Mar. 18, 1969

3,433,072
GAUGE FOR MEASURING THE LEVEL
OF A LIQUID IN A TANK
Aate R. Virtanen, Vatiala, Kangasala, and Aarne Matias
Auer, Takahuhti, Jukolankatu 12, Finland
Filed Dec. 18, 1967, Ser. No. 691,346
Claims priority, application Finland, Dec. 16, 1966,
3,354/66
U.S. Cl. 73—304      3 Claims
Int. Cl. G01f 23/26

ABSTRACT OF THE DISCLOSURE

A tubular rod extends into the liquid in a tank and forms an outer electrode of a capacitive type liquid level sensor. The inner electrode of the sensor is in the form of cable extending into the tubular rod and including an endpiece which provides for the axial adjustment thereof. A transmitter connected to the tubular rod renders an electrical signal indicative of the capacitance and accordingly the level of the liquid in the tank.

---

Figures 1, 2:
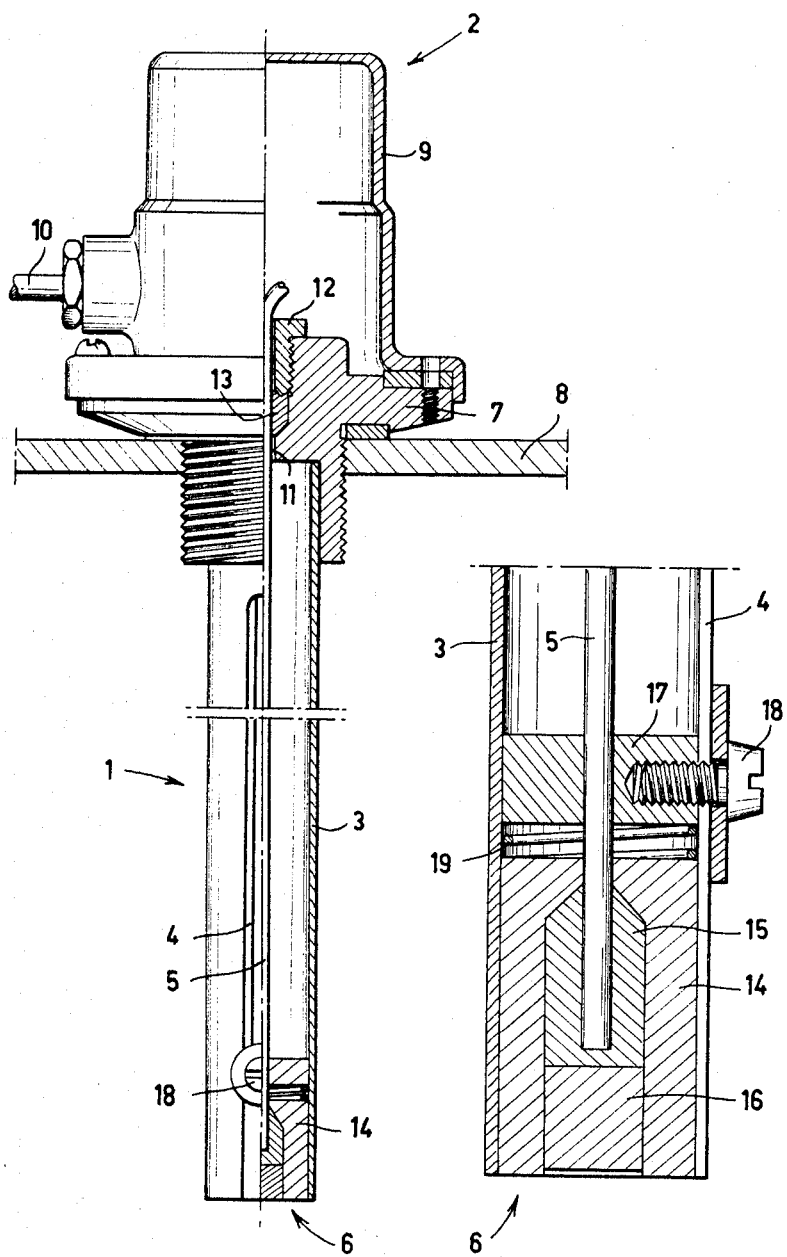

The present invention relates to a guage for measuring the level of a liquid in a tank or similar containers, comprising a tubular rod extending into the liquid in said tank and forming an outer electrode, an isolated cable positioned in said tubular rod and forming an inner electrode and a transmitter box fastened at the end of said tubular rod for measuring the capacitance between the electrodes.

Such a gauge can be used for several different purposes, e.g., in buildings, gasoline stations, dairies, wells, ships, etc., for measuring of the level of different liquids such as fuel oils, lubricating oils, water, milk, acids and alcohol.

The construction of the gauge is based on the principle of capacity measurement, where the tubular rod immersed in the liquid to be measured forms an outer electrode and the electric cable inside the rod forms an inner electrode and where the capacitance between the electrodes is proportional to the level of the liquid and to the kind of liquid in question. When the level of the liquid changes, the capacitance is also changing and the change is transferred by means of the transmitting elements of the gauge to a suitable registering device or to an adjusting mechanism.

As stated above the tubular rod constituting the measuring part of the gauge is intended to be immersed in the liquid, the level of which is to be gauged, whereby in practice the gauge is fixed to the cover or top of the liquid container or tank with the measuring part of the gauge extending downwards in the liquid and close to the tank bottom. Gauges are built with several different rod lengths to suit different tank heights, whereby for each tank is chosen the most suitable standard length. If, however, a standard length would be somewhat too long for the height of the tank, the gauge has to be mounted to protrude a corresponding amount above the tank. A protruding part on top of a tank is often a hindrance and liable to damage. The superfluous length of the rod cannot be cut off when mounting, because in that case the cut end of the inner electrode must be insulated anew and made pressure resistant and watertight, which cannot be done without special tools.

The object of this invention is to eliminate said drawbacks and the main characteristic feature of the gauge according to the invention is that the cable is at its lower end water-tightly insulated and fixed in an endpiece axially movable within said tubular rod and lockable thereto and that the cable is at the upper end of the tubular rod slidably passed through a hole in a watertight closure piece fitted between said tubular rod and said transmitter box.

According to the invention there is obtained a liquid level registering gauge, making possible the cutting off of the lower end of the tubular electrode to a length exactly required for the depth of the tank without requiring any difficult and tedious work on the site of installation. In order to adjust the tubular rod to the required length the endpiece of the inner cable electrode is first moved to a corresponding suitable distance from the closure piece at the top end of the rod and fixedly screwed to the tubular rod and the cable electrode is straightened by pulling it outwards through the closure piece, whereupon the tubular rod is cut off flush with the bottom of the endpiece. These operations are easily performed on the site of installation.

The invention is in the following more closely described in connection with the attached drawing, where:

FIGURE 1 shows a side view, partly in section of a preferred embodiment of a gauge according to the invention, FIGURE 2 shows an enlarged section of the lower end of the gauge.

The gauge shown in the drawing comprises two main parts, viz., a tubular measuring part 1 and a transmitter box 2 fixed to the upper end of the measuring part.

The measuring part 1 comprises a tubular steel rod 3, having an axial slit 4 extending almost along its entire length, a Teflon-covered copper cable 5 axially located inside the rod and an endpiece 6 to which the lower end of the cable 5 is fixed and watertightly insulated as closer described in connection with FIGURE 2.

The transmitter box 2 comprises a metallic base plate 7 by means of which the gauge can be fixed to a tank cover 8, a metallic cover 9 which by screws can be fixed to the base plate 7 and which contains a transmitter, not shown or described, the components of which (transistors, resistances, etc.), are imbedded in epoxyresin and thus protected against moisture. A wire 10 is leading to a registering device or similar.

The base plate 7 is provided with a hole 11 for the cable, a tightening nut 12 is screwed at the top end of said hole for compression of a packing 13.

As shown in FIGURE 2 the endpiece of the cable comprises a plug 14, into which the cable end is watertightly attached by means of the plugs 15 and 16, a locking ring 17, into which is screwed a locking screw 18 passing through the slit 4 in the tubular rod. Between the plug 14 and the locking ring 17 is a coil spring 19.

In order to adjust the length of the measuring part of the liquid level registering gauge to suit the liquid tank height the locking screw 18 and the tightening nut 12 are loosened and the cable 5 is pulled gently upwards through the guiding hole 11 until the endpiece has reached the required height within the tubular rod, whereafter the locking screw is tightened and the cable is straightened by pulling it upwards from its upper end and the nut 12 is tightened, thus locking the cable in a central position within the tubular rod and held stressed by the action of the coil spring 19. Finally the superfluous part of the tubular rod is cut off just below the endpiece. The gauge is now ready for mounting in the tank.

The drawing and the description referring to it are submitted only for the purpose of giving a fair conception of the invention. In certain details the liquid level gauge according to the invention may deviate from the described embodiment.

What we claim is:

1. A gauge for measuring the level of a liquid in a tank or similar containers, comprising a tubular rod extending into the liquid in said tank and forming an outer electrode, an insulated cable positioned in said tubular rod and forming an inner electrode and a transmitter box fastened at the end of said tubular rod for measuring the capacitance between the electrodes, characterized in that the cable is at its lower end watertightly insulated and fixed in an endpiece axially movable within said tubular rod and lockable thereto and that the cable is at the upper end of the tubular rod slidably passed through a hole in a watertight closure piece fitted between said tubular rod and said transmitter box.

2. A gauge according to claim 1, characterized in that the tubular rod is provided with a longitudinal slit and that the lower end of the cable is provided with a locking screw passing through said slit for holding the endpiece in a fixed position pressed against the inside wall of the tubular rod.

3. A gauge according to claim 2, characterized in that the endpiece of the cable comprises a plug watertightly attached to the cable, a locking ring positioned above said plug and surrounding the cable, said locking ring being provided with said locking screw, and a coil spring positioned between said plug and said locking ring.

References Cited
UNITED STATES PATENTS 2,477,511    7/1949    Comb.
3,367,183    2/1968    Webster _____ 73—304

LOUIS R. PRINCE, *Primary Examiner.*

DONALD O. WOODIEL, *Assistant Examiner.*

U.S. Cl. X.R.

317—246, 249